Figure 1:
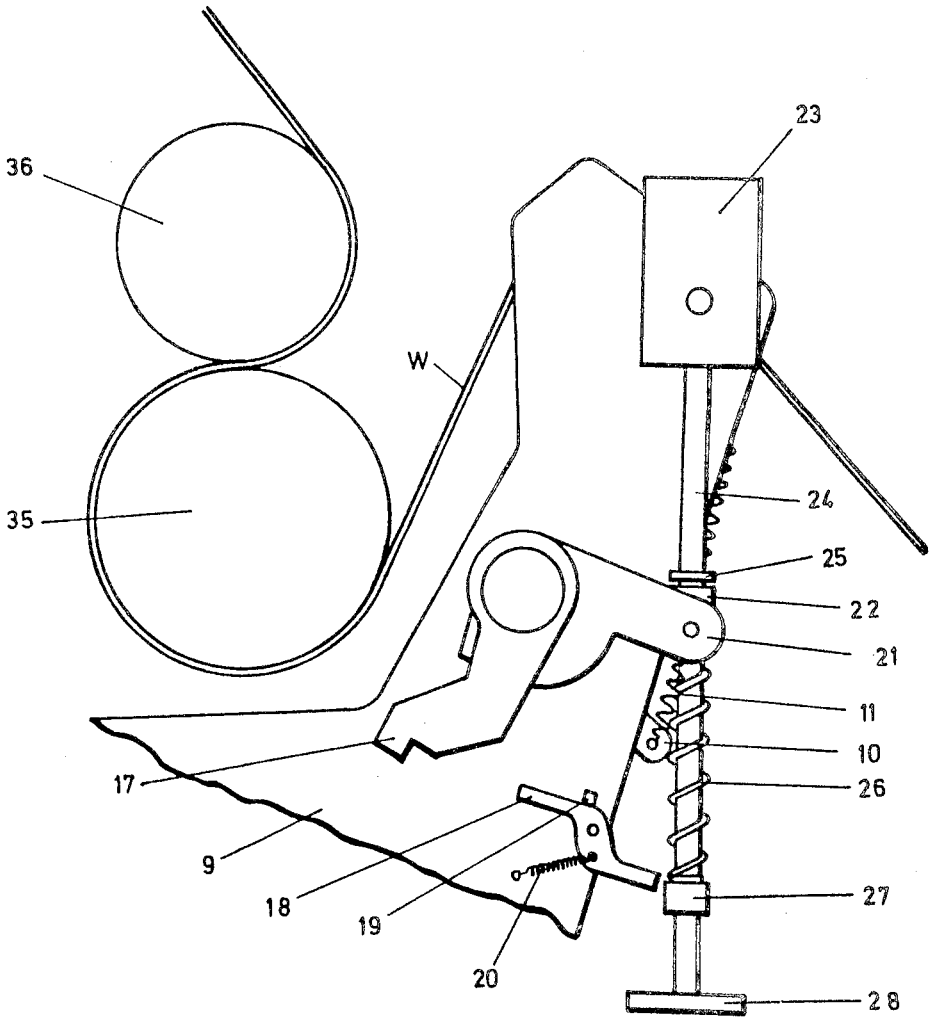
Figure 2:
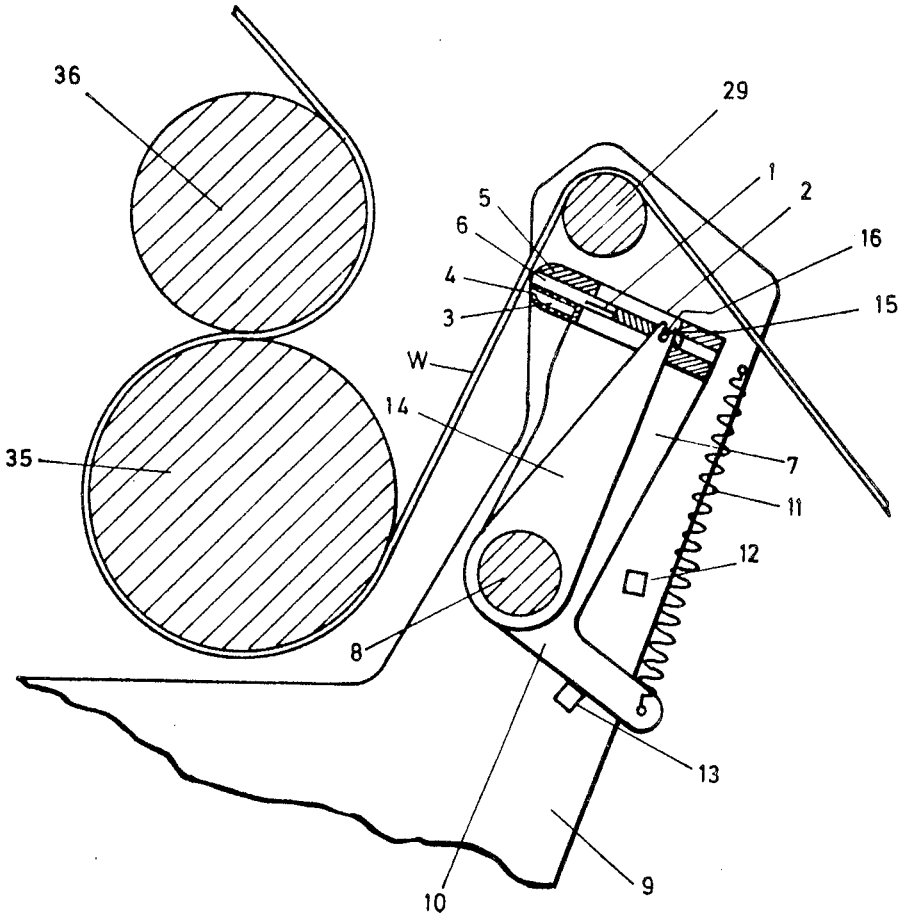
Figure 3:
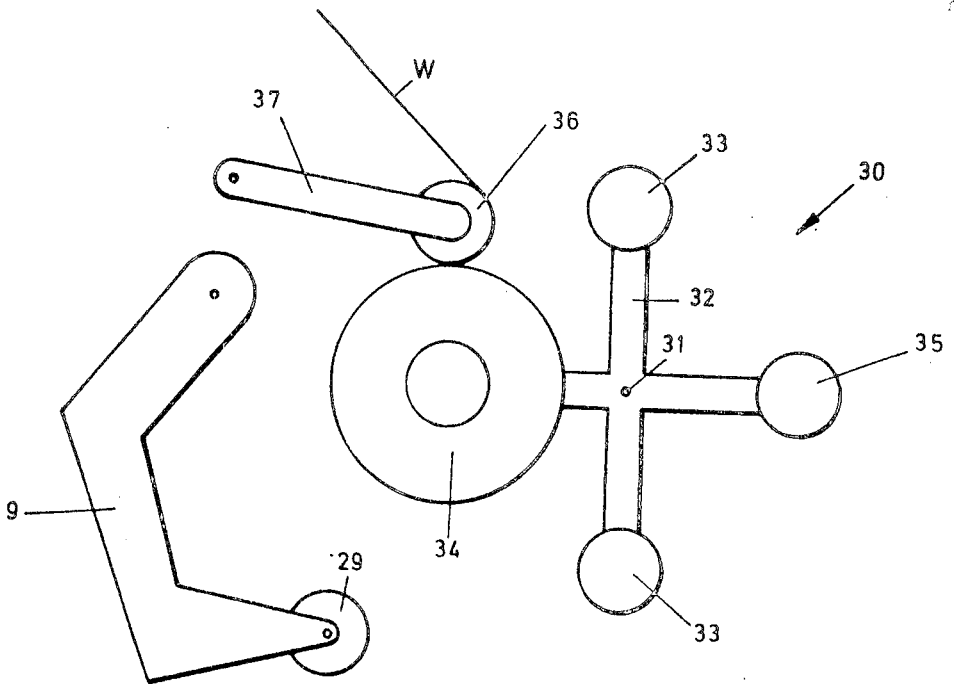
Figure 4:
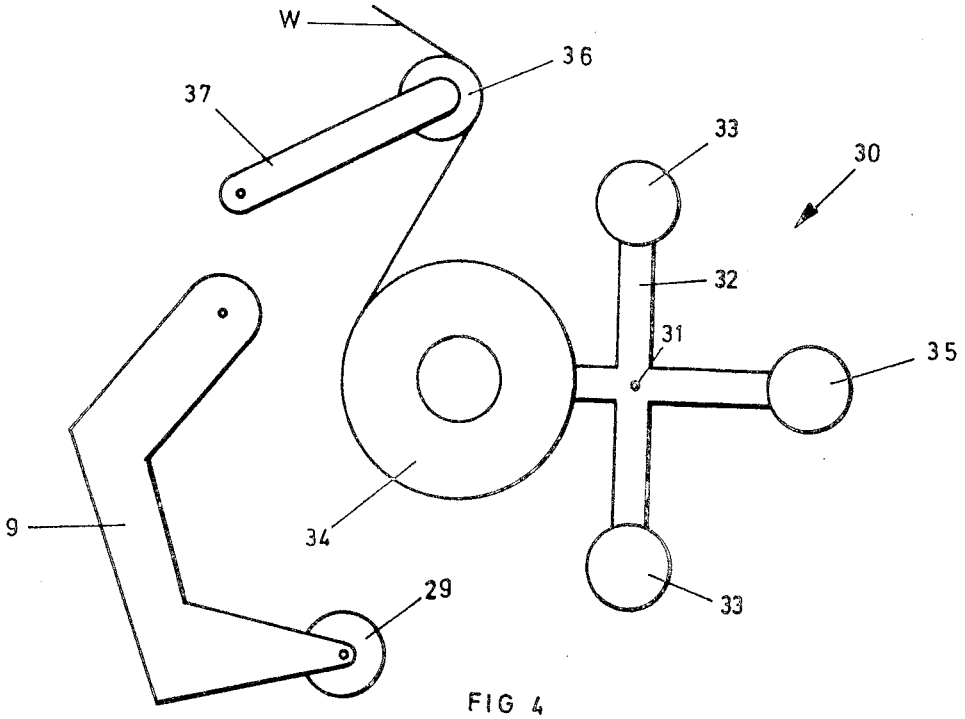
Figure 5:
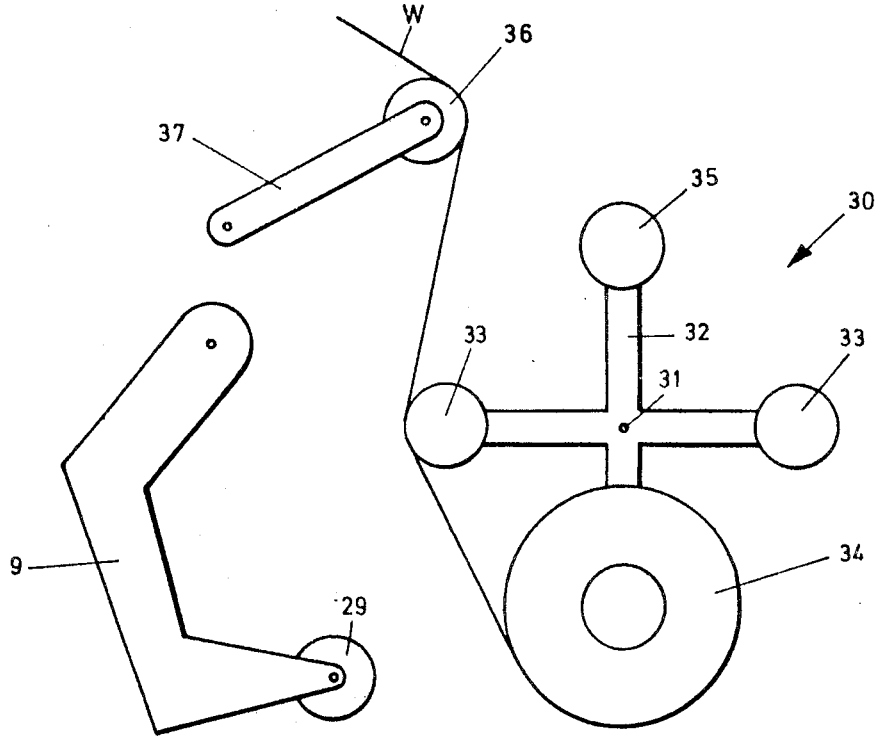
Figure 6:
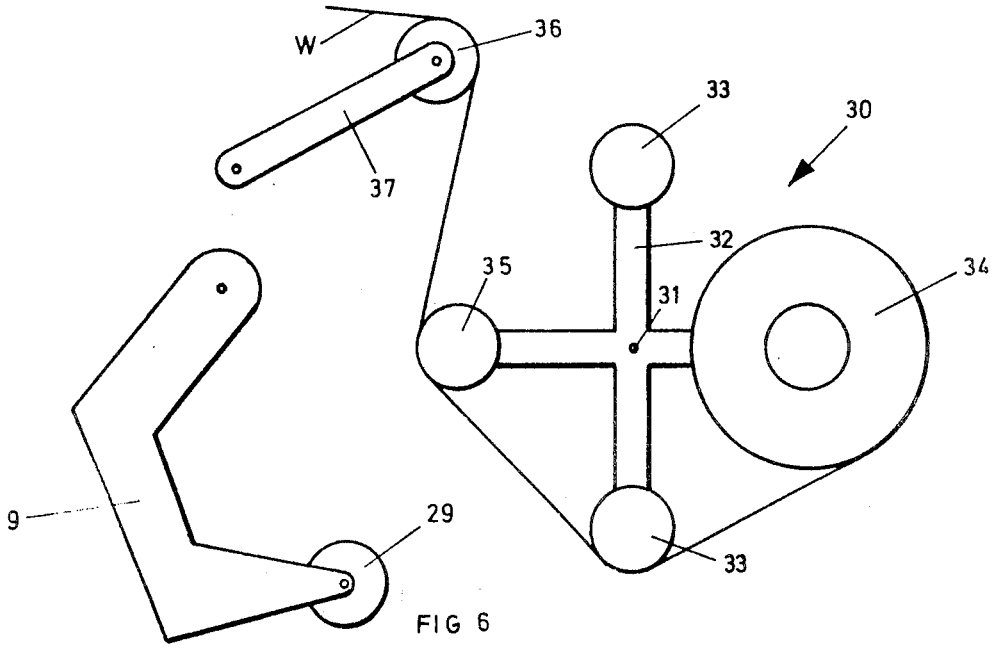
Figure 7:
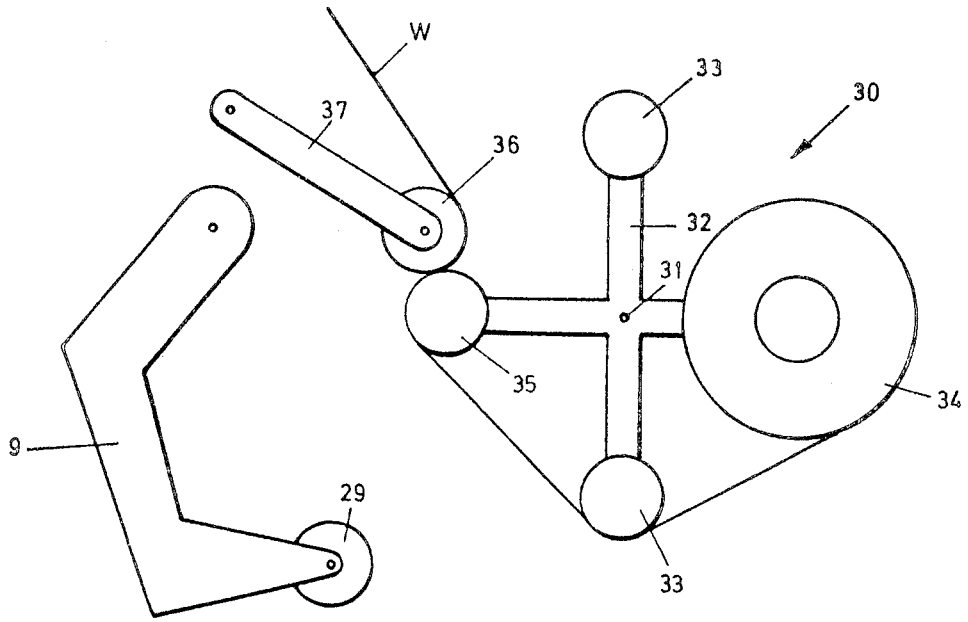
Figure 8:
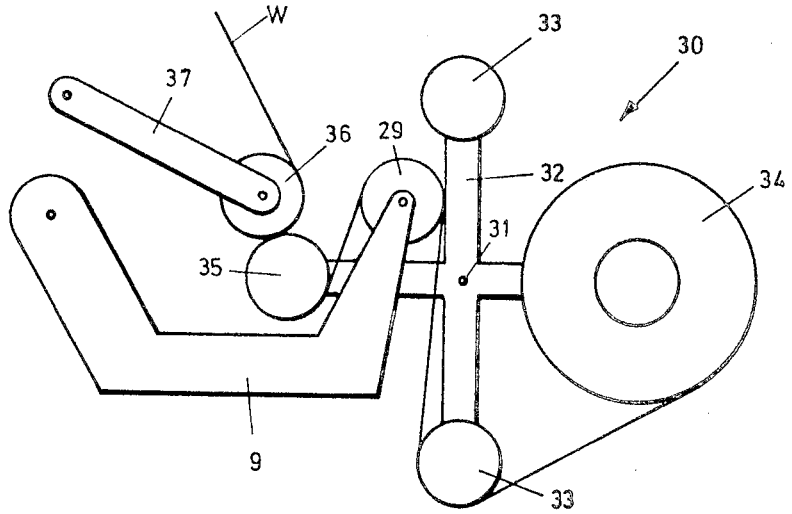
Figure 9:
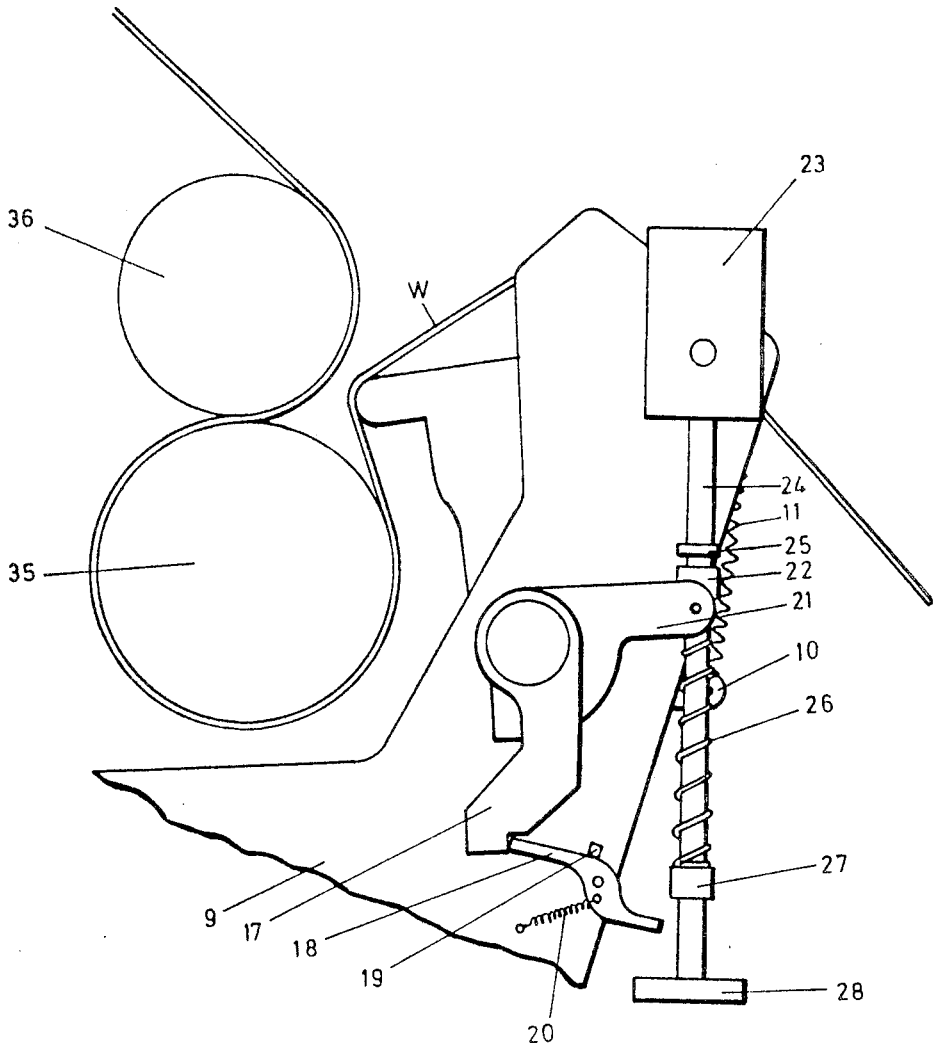
Figure 10:
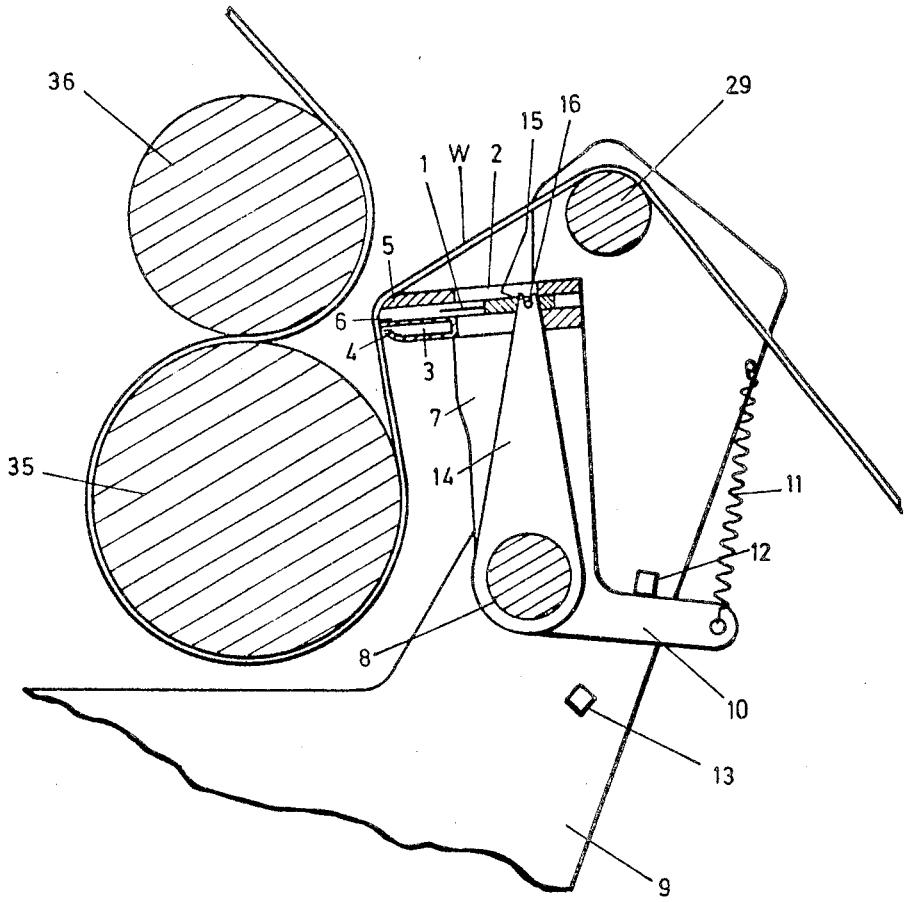
Figure 11:
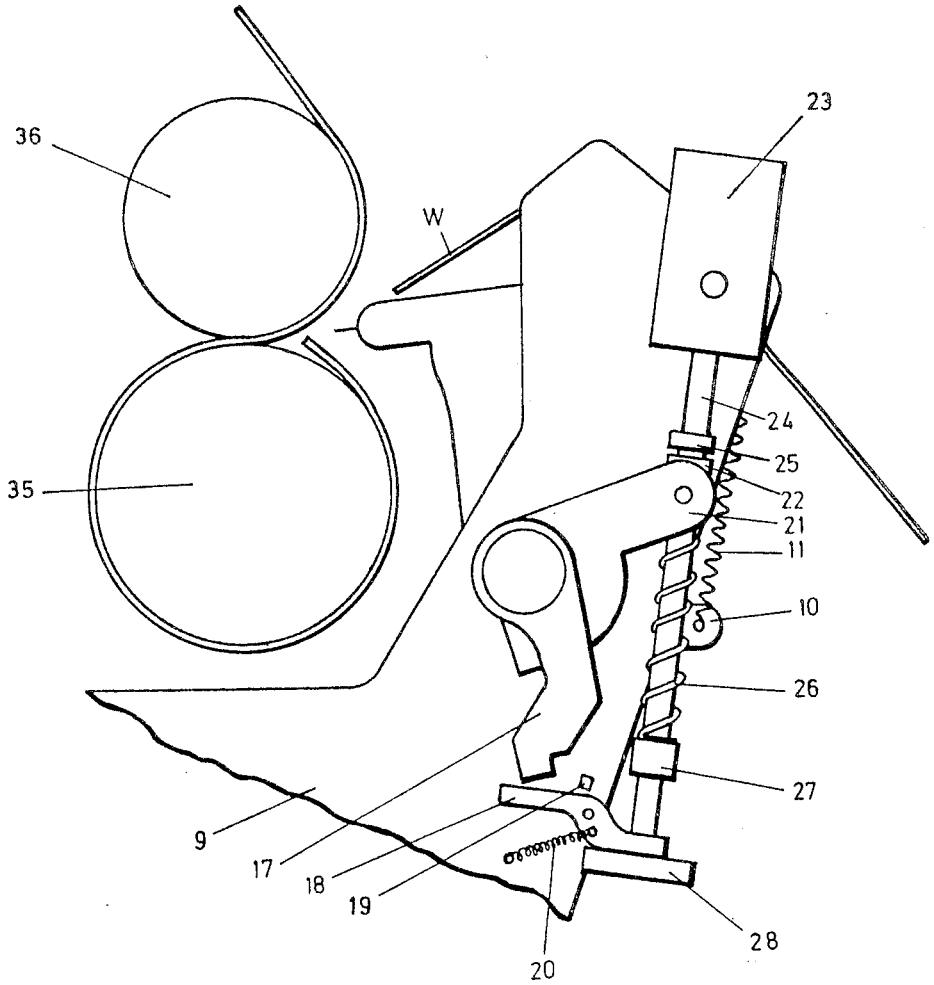
Figure 12:
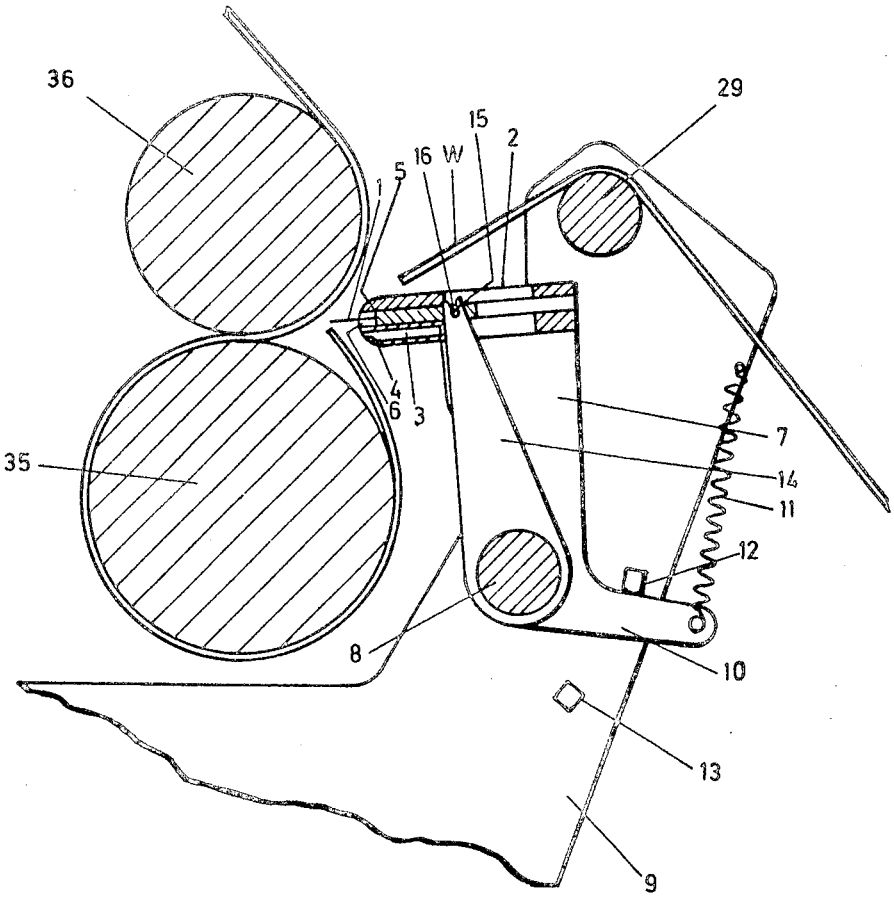

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED MAY 4, 1976

946 O.G. 9

T946,008

WEB WINDING APPARATUS

Nigel Colin Benson, Ickleford, and Roger Antony Hodgkins, Enfield, England, assignors to Imperial Chemical Industries Limited, London, England

Filed Mar. 27, 1975, Ser. No. 562,422
Claims priority, application Great Britain, Apr. 1, 1974, 14,283/74
**Int. Cl. B65h *19/20***
U.S. Cl. 242—56 R
9 Sheets Drawing. 15 Pages Specification

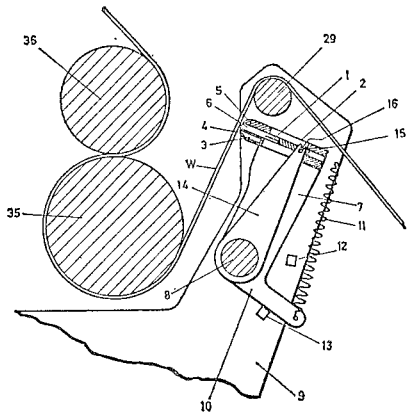

The knife assembly of a web autowinder comprises a blade mounted in a blade holder; both of these are pivotally supported on the same axis so that the whole assembly can be withdrawn from the web between cuts. The blade is moved by means of a pneumatic cylinder acting via a heavy duty spring which moves the blade when the web is cut. The blade holder is spring loaded towards the web but it is normally held back by the blade. The assembly operates as follows, the admission of low pressure air into the cylinder moves the blade towards the web and the holder follows under the action of its spring. This motion continues until the holder is arrested by a stop and the blade by a pawl. The admission of high pressure air to the cylinder cocks the heavy duty spring and subsequent release of the pawl allows this spring to impel the blade against the web and cut it. Preferably air is blown through the blade holder so that it acts as an air bearing.